United States Patent [19]

Bierley et al.

[11] 3,872,681

[45] Mar. 25, 1975

[54] TEMPERATURE MODIFYING METHOD UTILIZING A DOUBLE CONVEYOR CONTACT FREEZER

[75] Inventors: Howard L. Bierley, Chambersburg; Phares B. Witmer, III, Greencastle, both of Pa.

[73] Assignee: Frick Company, Waynesboro, Pa.

[22] Filed: May 21, 1974

[21] Appl. No.: 472,018

Related U.S. Application Data

[62] Division of Ser. No. 385,765, Aug. 6, 1973.

[52] U.S. Cl. .......................... 62/63, 62/374, 165/86
[51] Int. Cl. ........................................... F25d 13/06
[58] Field of Search ....... 62/63, 341, 374, 375, 380; 100/93 R, 93 RP, 92; 165/86

[56] References Cited
UNITED STATES PATENTS

| | | | |
|---|---|---|---|
| 2,124,233 | 7/1938 | Martin | 165/86 |
| 2,437,492 | 3/1948 | Allen | 165/86 |
| 2,808,236 | 10/1957 | Dickinson | 165/86 |
| 2,844,359 | 7/1958 | Annerhed | 62/380 |
| 3,280,590 | 10/1966 | Larsson | 62/380 |
| 3,387,464 | 6/1968 | Martin | 62/380 |
| 3,402,568 | 9/1968 | Kamin et al. | 62/380 |
| 3,664,149 | 5/1972 | Garland et al. | 62/380 |
| 3,777,988 | 12/1973 | Thompson | 62/374 |

Primary Examiner—Meyer Perlin
Assistant Examiner—Ronald C. Capossela
Attorney, Agent, or Firm—A. Yates Dowell, Jr.

[57] ABSTRACT

The method of modifying the temperature of a product by applying refrigerant to opposite sides of the product simultaneously. The method includes providing upper and lower imperforate metallic endless conveyors which engage opposite sides of a product to be frozen and each of such conveyors directly engages a pool of liquid refrigerant which is being continuously introduced into and discharged from each of the pools in a manner to provide equal distribution of the refrigerant.

4 Claims, 15 Drawing Figures

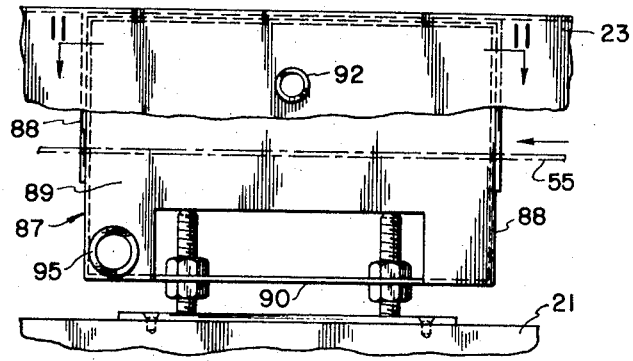
FIG. 9
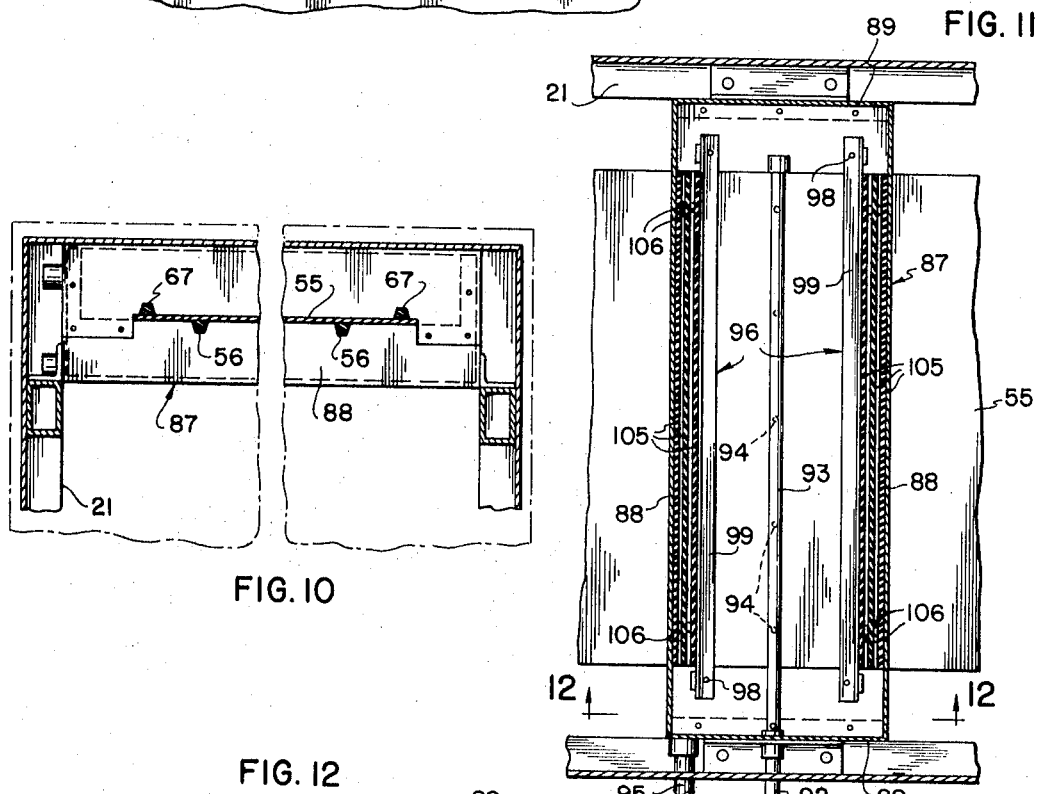
FIG. 10
FIG. 11
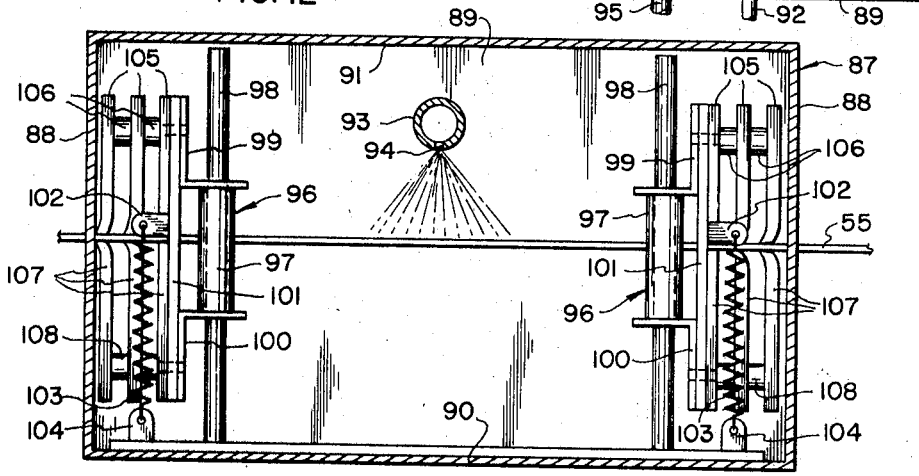
FIG. 12

TEMPERATURE MODIFYING METHOD UTILIZING A DOUBLE CONVEYOR CONTACT FREEZER

This is a division, of application Ser. No. 385,765 filed Aug. 6, 1973.

BACKGROUND OF THE INVENTION

1. Field of the Invention.

This invention relates generally to the method of modifying the temperature of a product and relates particularly to a method of contact freezing having multiple imperforate conveyors engaging opposite sides of a product to be frozen and each of such conveyors is in heat exchange relation with a pool of liquid refrigerant to effect a rapid transfer of heat from the articles.

2. Description of the Prior Art

Heretofore many efforts have been made to remove heat from various products by conveying such products through a refrigerating apparatus until the products are frozen so that they can be kept for an indefinite period of time substantially without deterioration. In the past both refrigerated air and refrigerated liquid have been utilized for effecting the heat transfer.

Some efforts have been made to provide double conveyor contact freezers in which a liquid refrigerant was projected downwardly onto the upper conveyor while liquid refrigerant was simultaneously projected upwardly into contact with the lower conveyor to remove heat from two sides of the product simultaneously. Some examples of these prior art structures are the U.S. Pat. Nos. 1,773,079, 1,822,124 and 2,014,550 to Birdseye, U.S. Pat. No. 2,324,517 to King and British Pat. Nos. 625,382 of 1949 and 823,892 of 1959.

In order to freeze the product more rapidly, liquid refrigerant such as a brine solution of 28 to 30 percent calcium chloride by weight has been chilled to a temperature of from −10° F to −40° F to provide a more rapid transfer of heat and thereby reduce the time required for freezing an article. At these temperatures the brine solution has a viscosity of from approximately 14.5 to 36.2 centipoises and has a thick consistency so that the ability to flow is substantially reduced. An example of a structure using this type of refrigerant is U.S. Pat. No. 3,664,149 to Garland et al.

SUMMARY OF THE INVENTION

The present invention is embodied in a double conveyor contact freezer having upper and lower imperforate endless conveyors spaced apart a distance corresponding substantially to one dimension of the product being frozen and each of such conveyors is in direct engagement with a pool of refrigerant liquid such as a brine solution having a temperature of from −10° F to −40° F. The lower pool of refrigerant is similar to the Garland et al. U.S. Pat. No. 3,664,149. The upper conveyor is provided with a pair of generally parallel inwardly extending flexible ribs which function as drive belts and as weirs to retain a pool of liquid refrigerant in direct engagement with the conveyor and permit liquid refrigerant to flow over such weirs along substantially the entire lower run of the upper conveyor and spill from opposite sides thereof. To prevent liquid refrigerant from flowing under the upper conveyor, a flexible obstruction or V-belt is attached to the conveyor and extends outwardly thereof to break the surface tension of the refrigerant. The refrigerant falls by gravity into an open top trough or collector pan from which it is discharged from the apparatus. The upper conveyor is adjustably mounted relative to the lower conveyor to accommodate articles of varying sizes and configurations.

Both the upper and lower conveyors have apparatus for washing and cleaning the same. The upper conveyor cleaner includes means for engaging opposite sides of the conveyor with such means being mounted in a manner to float to remain in intimate engagement with the conveyor regardless of the vertical position of the conveyor within the housing.

It is an object of the invention to provide a method of freezing a product by providing a double conveyor refrigeration system in which the conveyors engage opposite sides of a product to be frozen and each of such conveyors is in direct engagement with a pool of flowing liquid refrigerant.

Another object of the invention is to provide a method of freezing a product in which a double conveyor contact freezer is provided having a separate pool of liquid refrigerant directly engaging each conveyor and in which the liquid refrigerant is continuously being introduced into and discharged from each of the pools and is prevented from engaging the product being frozen.

BRIEF DESCRIPTION OF THE DRAWINGS

FIG. 9 is an end elevation of the upper conveyor cleaning mechanism.

FIG. 10 is a side elevation thereof.

FIG. 11 is a section on the line 11—11 of FIG. 9.

FIG. 12 is an enlarged section on the line 12—12 of FIG. 11.

DESCRIPTION OF THE PREFERRED EMBODIMENT

With continued reference to the drawings, a double conveyor contact freezing apparatus 20 is provided having a frame 21 on which a lower conveyor housing 22 is fixed and an upper conveyor housing 23 is adjustably mounted. Each of the lower and upper housings includes insulated wall structure for retarding the ingress of heat from the atmosphere into the freezing apparatus.

Figure 1:
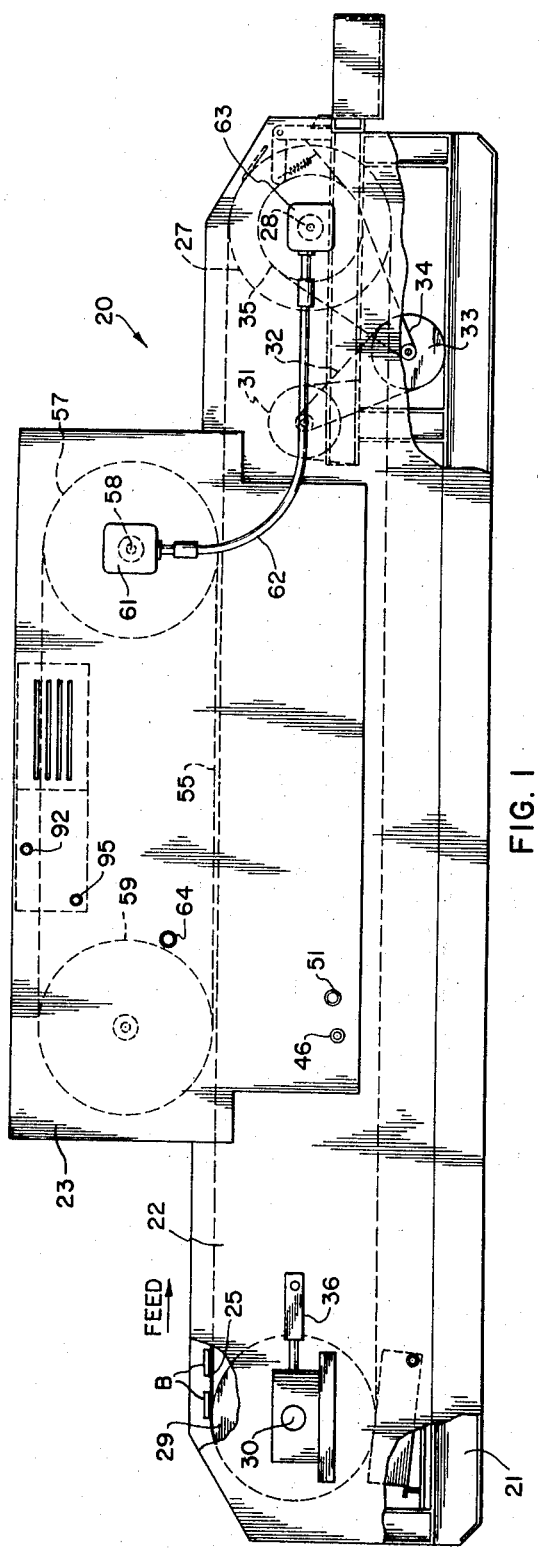
FIG. 1 is a side elevation of a double conveyor contact freezer in accordance with the present invention.
Figure 2:
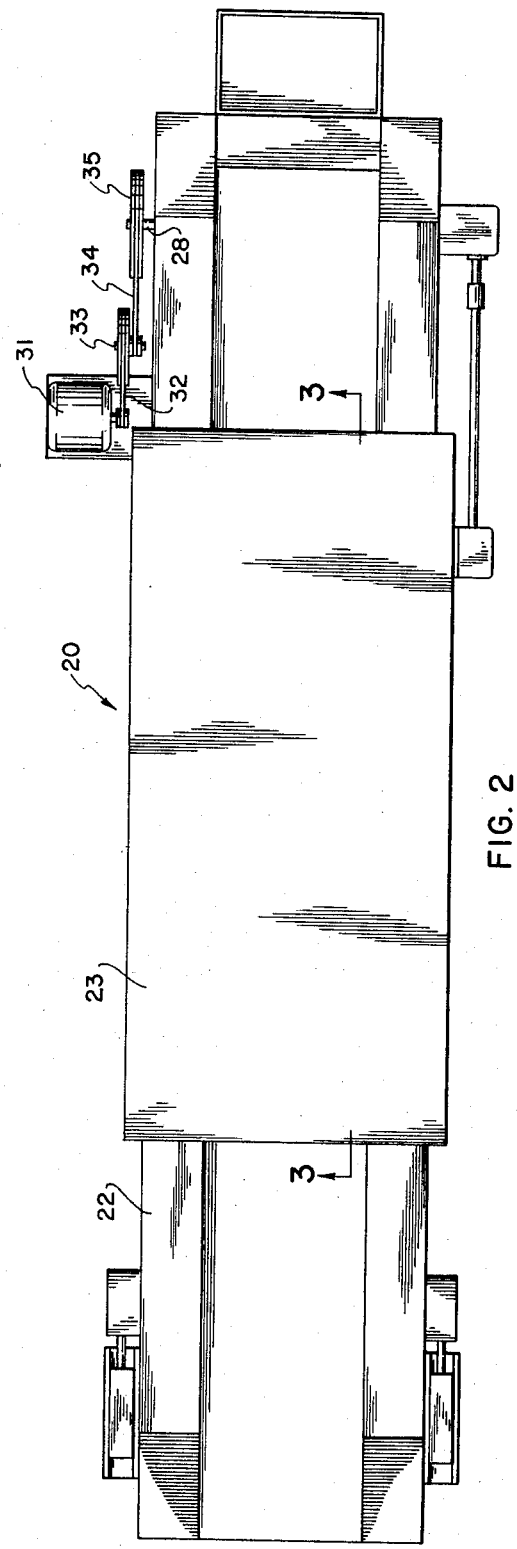
FIG. 2 is a top plan view thereof.

The lower housing 22 includes a flexible imperforate metallic endless conveyor 25 having a pair of generally parallel flexible ribs or drive belts 26 mounted on the inner surface thereof and such ribs engage a pair of drive pulleys 27 mounted on a shaft 28 adjacent to one end of the housing 22 and a pair of idler pulleys 29 mounted on a shaft 30 adjacent to the other end thereof. The drive shaft 28 is driven by a conventional power plant 31 such as a variable speed electric or hydraulic motor or an internal combustion engine having a belt or chain 32 driving a speed reducing mechanism 33. The speed reducing mechanism drives a belt or chain 34 which in turn drives a driven pulley or sprocket 35 fixed to the shaft 28 in a manner to cause the upper run of the conveyor 25 to move from left to right, as illustrated in FIG. 1. The idler shaft 30 is provided with a conventional adjusting mechanism 36 to adjust the tension on the conveyor 25.

Figure 3:
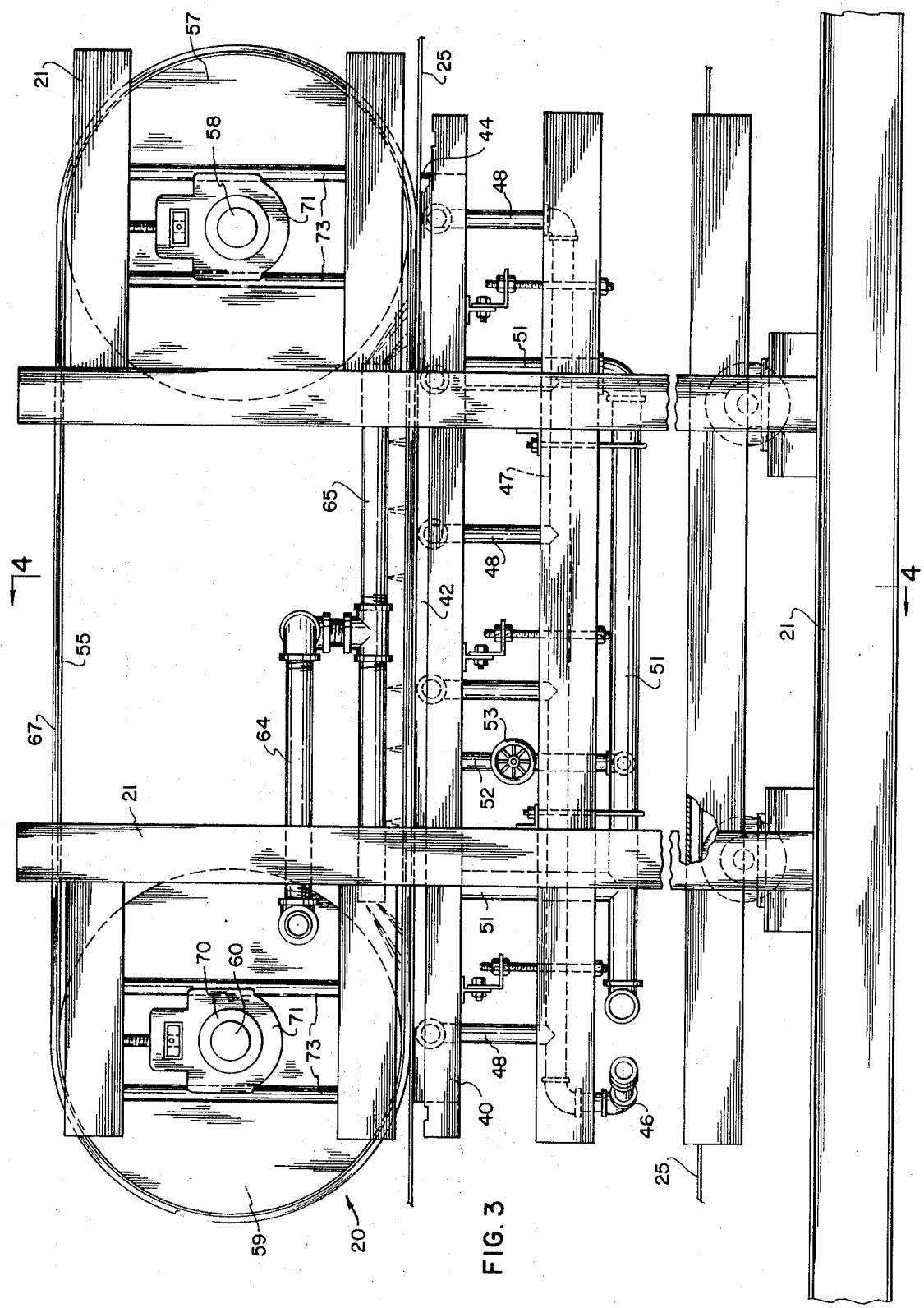
FIG. 3 is an enlarged fragmentary section on the line 4—4 of FIG. 2.
Figure 4:
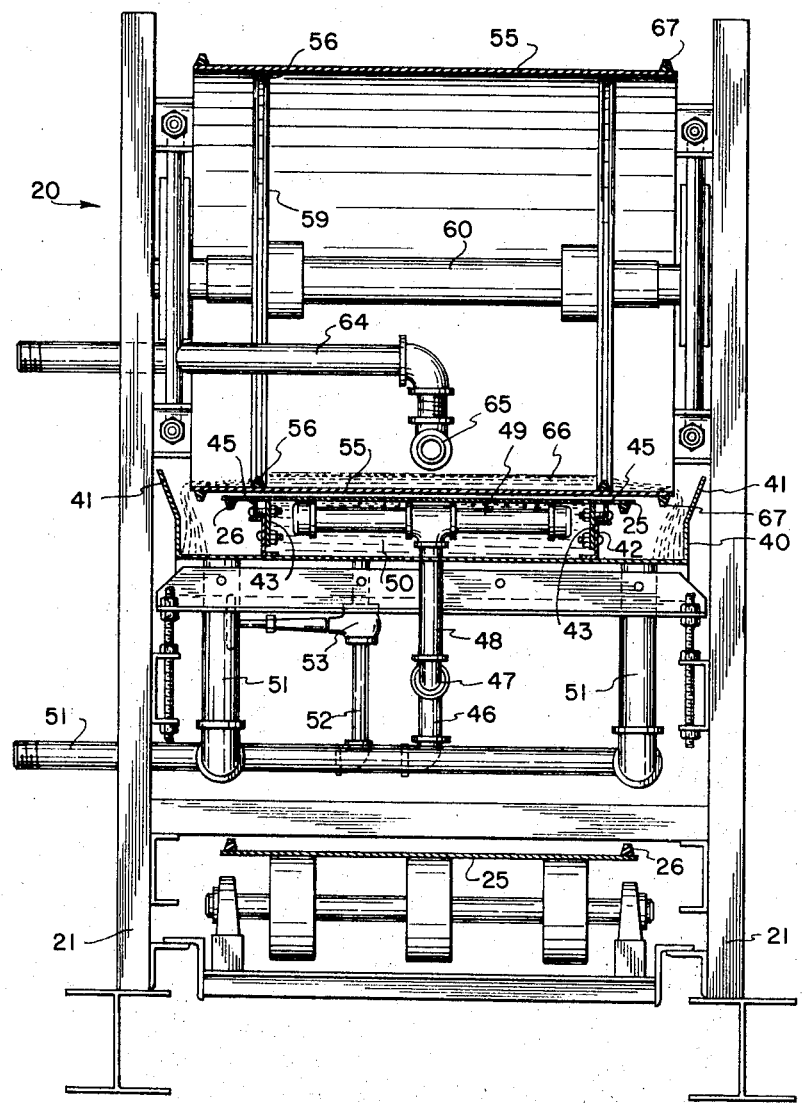
FIG. 4 is a section on the line 4—4 of FIG. 3.

With particular reference to FIGS. 3 and 4, an open top drain pan 40 having upwardly inclined splash shields 41 along opposite sides is supported on the frame 21 between the pulleys 27 and 29. Within the drain pan 40, an open top trough 42 is provided which includes a pair of side walls 43 and a pair of end walls 44 (FIG. 3). Each of the side walls 43 has a plurality of openings (not shown) equally spaced along their lengths adjacent to their upper edges. Spaced outwardly of and generally parallel with the side walls 43 is a vertically adjustable weir 45 for regulating the flow of refrigerant from the trough.

Liquid refrigerant such as a brine solution of 28 to 30 percent calcium chloride by weight or the like which has been chilled to a temperature of from −10° F to −40° F in a chiller (not shown) is introduced through an inlet line 46 to a longitudinal header 47 (FIG. 3) and from the longitudinal header the liquid refrigerant flows upwardly through a plurality of branch lines 48 to transverse headers 49 located within the trough 42. The liquid refrigerant is pumped under low pressure and is discharged from the transverse headers into the open top trough 42 to provide a pool of liquid refrigerant 50 which engages the lower surface of the upper run of the conveyor 25.

As liquid refrigerant is pumped from the headers 49 into the pool, such refrigerant is distributed substantially equally throughout the trough 42 which causes refrigerant to continuously flow over substantially the entire length of the weirs 45 at each side of the trough 42 into the drain pan 40. The drain pan has a plurality of drain lines 51 which return the liquid refrigerant to the chiller where the absorbed heat is removed and the liquid is reintroduced into the inlet line 46. A small drain line 52 having a manually operated valve 53 provides communication between the trough 42 and the drain line 51 to remove liquid refrigerant from the trough when the freezing apparatus is shut down.

The upper conveyor housing 23 includes a flexible imperforate metallic endless conveyor 55 having a pair of generally parallel flexible ribs 56 mounted on the inner surface thereof. The ribs 56 engage a pair of drive pulleys 57 mounted on a shaft 58 adjacent to one end of the housing and a pair of idler pulleys 59 mounted on a shaft 60 adjacent to the other end thereof. In order to drive the shaft 58 and the upper conveyor 55, one end of such shaft has an angle drive mechanism 61 which is driven by a flexible cable 62 from an angle drive mechanism 63 fixed to the end of the drive shaft 28. The drive mechanisms 61 and 63 are substantially identical so that the upper conveyor 55 is driven at the same speed as the lower conveyor 25 and the lower run of the upper conveyor is driven in the same direction as the upper run of the lower conveyor or from left to right, as illustrated in FIG. 1.

The upper housing 23 is shorter in length than the lower housing 22 and is mounted generally centrally thereof in a longitudinal direction to provide a feed station at one end of the lower housing and a discharge station at the opposite end. Articles to be frozen such as vegetables, fruits, meats, fish and the like normally are placed in boxes B and are fed onto the lower conveyor 25 at the feed station. All of the boxes being processed at one time normally are of the same height and therefore the upper conveyor 55 is spaced from the lower conveyor 25 a distance corresponding to the height of the boxes so that the conveyors engage the top and bottom surfaces of the boxes. Such engagement not only increases the heat exchange surfaces but also tends to reduce expansion of the boxes in a vertical direction when the material within the boxes is frozen. This permits easier packing and handling of the boxes in subsequent operations.

In order to cause more rapid freezing of the product, the upper housing 23 is provided with an inlet line 64 through which liquid refrigerant flows to a longitudinally disposed header 65 located above the lower run of the upper conveyor 55. The header 65 extends along the central portion of the conveyor 55 and is provided with a plurality of orifices which discharge liquid refrigerants onto the conveyor between the flexible ribs 56. Such flexible ribs function as weirs to cause a pool 66 of refrigerant to form on the lower run of the upper conveyor.

When the pool of refrigerant reaches the top of the ribs or weirs 56, such liquid refrigerant flows over the same and is discharged from the sides of the conveyor 55. In order to break the surface tension of the refrigerant, a flexible V-belt or other flexible obstruction 67 is attached to the outer surface of the upper conveyor 55 adjacent to each edge thereof to cause the refrigerant to fall by gravity into the drain pan 40 where it flows through the drains 51 back to the chiller for reprocessing.

When boxes B of a different height are to be processed, it is necessary that the space between conveyors be altered so that both conveyors remain in engagement with the boxes. With particular reference to FIGS. 3 and 5–8, it will be seen that each end of each of the shafts 56 and 60 is journaled in a bearing 70 carried by a slide block 71. The opposite sides of the block 71 are provided with arcuate recesses 72 which slidably engage a pair of spaced parallel generally vertically disposed guide posts 73. The lower ends of the posts 73 are welded or otherwise attached to a lower bar or plate 74 and the upper ends of the posts are welded or otherwise attached to an upper bar or plate 75. In order to raise and lower the slide block 71, a threaded post 76 is fixed at one end to the slide block 71 and extends upwardly through an opening 77 in the upper bar 75. A threaded nut 78 engages the posts 76 and is supported by the bar 75 to maintain the slide block 71 in fixed adjusted position.

Figure 6:
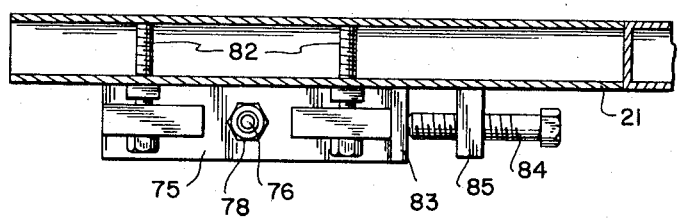
FIG. 6 is a section on the line 6—6 of FIG. 5.
Figure 5:
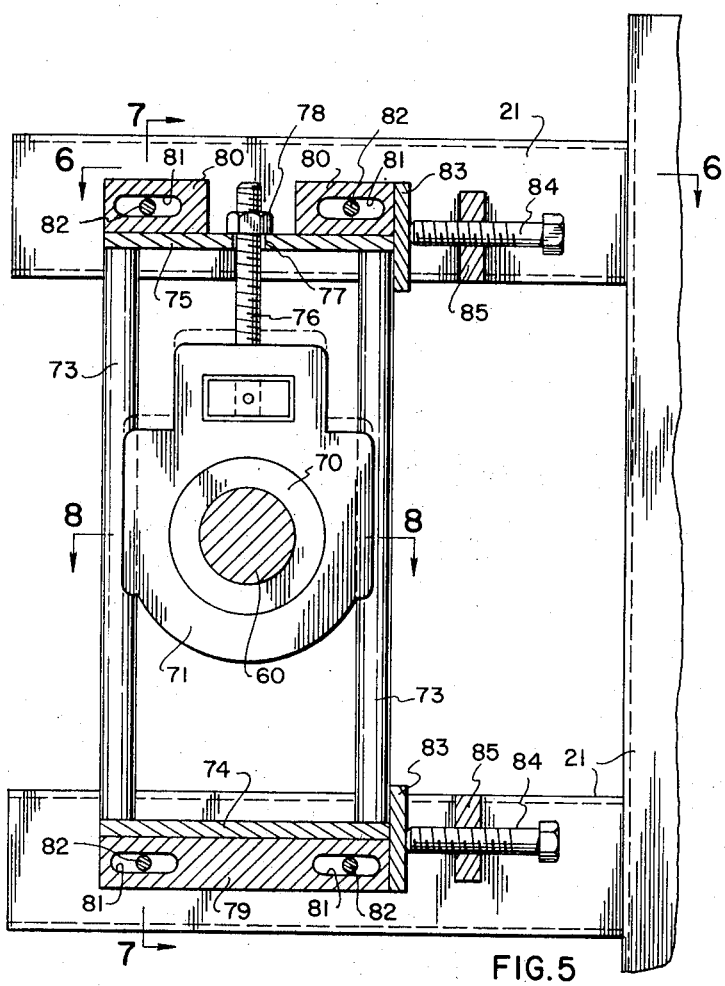
FIG. 5 is an enlarged detailed section of the vertical adjusting mechanism of the upper conveyor.
Figure 7:
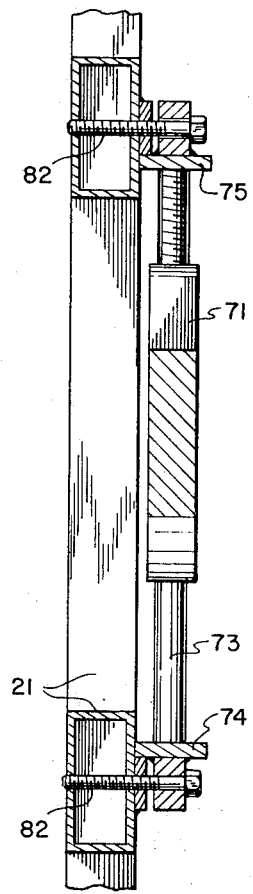
FIG. 7 is a section on the line 7—7 of FIG. 5.
Figure 8:
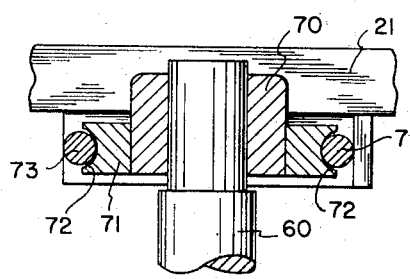
FIG. 8 is a section on the line 8—8 of FIG. 5.

A substantial amount of expansion and contraction takes place in the metallic conveyor 55 and in order to adjust the tension on such conveyor some means must be provided for moving the shafts 58 and 60 toward and from each other. As illustrated in FIGS. 5–7, this is done by providing the lower bar 74 with a retaining bar 79 and providing the upper bar 75 with a pair of spaced retaining bars 80. The retaining bars 79 and 80 are each provided with horizontally disposed longitudinally extending slots 81 which slidably receive bolts or pins 82 secured to the frame 21 of the freezing apparatus 20. A buffer pad 83 is welded or otherwise fixed to the inner end of each of the bars 74 and 75 and each of such pads engages the end of a screw 84 threadedly carried by a lug 85 which is welded or otherwise mounted on the frame 21. Rotation of the screws 84 causes the retaining bars 79 and 80 to slide lengthwise along the pins 82 to adjust the tension on the upper conveyor 55.

With particular reference to FIGS. 9-12, it is desirable to clean the upper conveyor 55 after the product being frozen is discharged from the apparatus. To do this the upper run of the upper conveyor passes through a substantially water-tight container 87 having sides 88, ends 89 and a bottom 90. The top of the container may be closed by the housing 23 or may include an independent top 91. Water or other cleaning fluid is introduced into the container 87 through an inlet line 92 connected to a header 93 having a plurality of orifices or nozzles 94 directed downwardly onto the conveyor 55. A drain line 95 extends from the bottom of the container 87 outwardly of the housing 23 and discharges water or other cleaning fluid from the container.

As shown best in FIGS. 11 and 12, a pair of floating frames 96 are mounted within the container 87. Each of the frames 96 includes a sleeve 97 at each end which is slidably mounted on an upstanding guide post 98 adjacent each end of the container. Each frame has an upper angle member 99 extending across the upper portion of the container 87 and a lower angle member 100 extending across the lower portion of the container 87. Opposite ends of the members 99 and 100 are connected to the upper and lower ends of the sleeves 97 on opposite sides of the container. Generally vertically disposed straps 101 connect opposite ends of the upper and lower angle members and are secured thereto in any desired manner as by welding, fasteners or the like to provide support frames adjacent to the front and rear of the container. Each of the straps 101 has an outwardly extending lug 102 to which one end of a spring or other resilient member 103 is attached and the opposite end of such spring is connected to a lug 104 extending upwardly from the bottom 91 of the container. The springs 103 normally urge the floating frames 96 in a downward direction.

A plurality of resilient blades or squeegees 105 are mounted on each of the upper angle members 99 and extend downwardly therefrom. Such blades are normally in spaced generally parallel relationship with each other and are separated by spacers 106. A corresponding number of resilient blades 107 separated by spacers 108 are connected to the lower angle members 100 and extend upwardly therefrom. Preferably the blades 105 and 107 are in abutting relationship with each other so that when the conveyor 55 passes between such blades all water and foreign material are removed from the conveyor.

Figure 13:
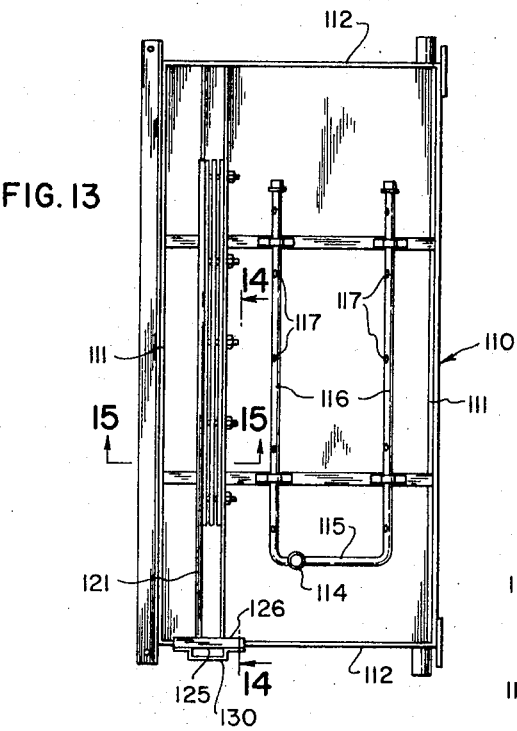
FIG. 13 is a top plan view of the lower conveyor cleaning apparatus.
Figure 15:
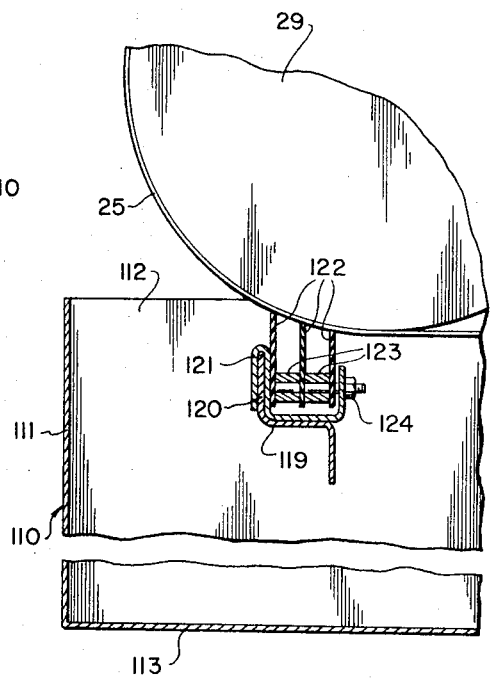
FIG. 15 is an enlarged section on the line 15—15 of FIG. 13.
Figure 14:
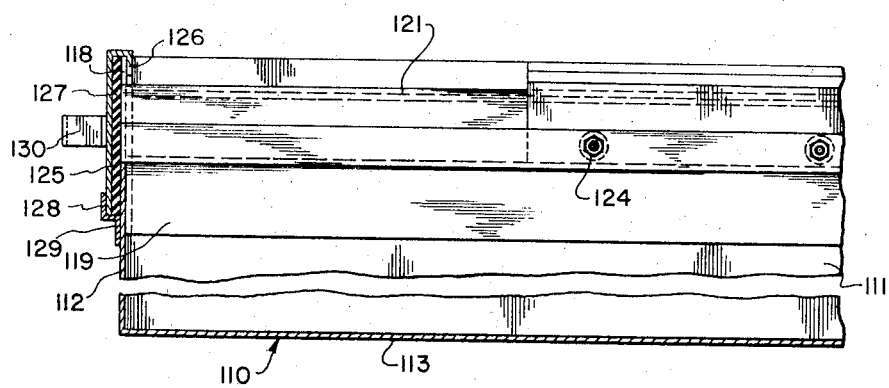
FIG. 14 is an enlarged section on the line 14—14 of FIG. 13.

The lower conveyor 25 may be provided with cleaning equipment similar to the cleaner of the upper conveyor, or if desired the lower conveyor can be cleaned by the apparatus illustrated in FIGS. 13-15. In this embodiment the conveyor cleaner includes a container 110 having sides 111, ends 112 and a bottom 113 with the upper portion of the container being open. An inlet line 114 extends into the container 110 and is connected to a header 115 to which a pair of branch lines 116 are connected. Each of the branch lines includes a plurality of spaced orifices or spray nozzles 117 through which water or other cleaning fluid under pressure is directed against the conveyor 25.

One of the ends of the container is provided with a generally rectangular opening 118 extending downwardly from the upper edge and an angularly disposed brace 119 extends between and is connected to opposite ends 112 of the container adjacent to the opening 118. The brace 119 includes an upwardly extending flange 120 on which a mounting bracket 121 is clipped. A plurality of flexible blades or squeegees 122 are spaced from each other by spacers 123 and are mounted on the bracket 121 in any desired manner, as by fasteners 124 or the like. As illustrated best in FIG. 15, the blades 122 have varying heights to fit the curvature of the conveyor 25 as such conveyor passes around the idler pulleys 29. The mounting bracket 121 is fixed to an end plate 125 having an inwardly and downwardly extending flange 126 at the upper end thereof and such flange is adapted to overlie the end of the container 110 when the mounting bracket extends through the opening 118. Preferably a rubber or other resilient gasket 127 seals the end plate 125 across the opening 118 and prevents water from escaping from the container 110.

With reference to FIG. 14, the lower end of the end plate 125 is disposed adjacent to an upstanding lip 128 of a mounting bracket 129 to compress the gasket 127 to make certain that water does not leak around the end plate 125. If desired the end plate 125 can be provided with a handle 130 to facilitate the application and removal of the mounting bracket 121 and the blades 122.

In the operation of the device, the slide blocks 71 are adjusted to accommodate boxes or packages of predetermined thickness after which refrigerant is introduced through the inlet line 46 into the trough 42 to provide a pool of refrigerant 50 and simultaneously liquid refrigerant is introduced through the inlet line 64 to form a pool of refrigerant 66 between the ribs 56 of the upper conveyor 55. When the power plant 31 is operated, the lower conveyor 25 and the upper conveyor 55 are operated simultaneously in a manner that the lower run of the upper conveyor and the upper run of the lower conveyor which are located adjacent to each other are travelling in the same direction and at the same speed. As boxes B are fed onto the lower conveyor at the feed station, such boxes pass beneath and are engaged by the lower run of the upper conveyor so that both the upper and lower surfaces of the boxes are in heat exchange relationship with the portion of the conveyors which engages the pools 50 and 66, respectively. Since the conveyors contact a substantial portion of the periphery of the boxes, the heat from the boxes is quickly absorbed by the refrigerant so that by the time the boxes are moved to the discharge station the contents of the boxes are frozen solid. The liquid refrigerant within the freezing apparatus is constantly moving and is substantially equally distributed to provide uniform cooling throughout substantially the entire freezing area. Liquid refrigerant in the upper pool 66 which has absorbed heat, rises to the top of the pool where it overflows the ribs or weirs 56 and is discharged from the sides of the conveyor 55. The obstructions 67 break the surface tension of the liquid refrigerant and prevent such refrigerant from flowing under the upper conveyor 55 to the boxes of product. Instead the liquid refrigerant from the upper conveyor 55 is discharged into the drain pan 40 where it passes through the drains 51 back to the chiller.

We claim:

1. The method of freezing products comprising the steps of: providing a first generally horizontal conveyor located in engagement with an open top trough, continuously introducing liquid refrigerant into said trough so that one surface of said conveyor is in direct heat exchange relationship with said liquid refrigerant, continuously discharging liquid refrigerant along substantially the entire length of said trough, providing a second generally horizontally disposed conveyor in predetermined spaced relationship to said first conveyor, providing a pair of spaced weir means along one surface of said second conveyor, continuously introducing liquid refrigerant onto said second conveyor between said weir means to cause said liquid refrigerant to overflow said weir means, driving said first and second conveyors at substantially the same speed, and introducing the product to be frozen between said conveyors so that said conveyors engage opposite sides of said product.

2. A method of freezing products within a housing having first conveyor means engaging one side of the product comprising the steps of: providing second conveyor means having one surface engaging another side of the product, providing a pair of spaced weir means on another surface of said second conveyor means, continuously introducing liquid refrigerant onto the other surface of said second conveyor means between the weir means and causing said liquid refrigerant to overflow said weir means and fall by gravity from said second conveyor means, collecting the liquid refrigerant which overflows, introducing the product to be frozen between said first and second conveyor means, and driving at least said second conveyor means to move said product through the housing in heat exchange relationship with said second conveyor means to freeze the product.

3. The method of claim 2 including the step of driving the first conveyor means at substantially the same speed as said second conveyor.

4. The method of claim 2 including the step of vertically adjusting one of said conveyor means relative to the other conveyor means to accommodate products of different sizes.

* * * * *